US012632954B2

(12) United States Patent (10) Patent No.: US 12,632,954 B2
Yun et al. (45) Date of Patent: May 19, 2026

(54) APPARATUS FOR INSPECTING THE APPEARANCE OF PRODUCTS

(71) Applicant: AIVEX Co., Ltd., Yongin-si (KR)

(72) Inventors: Seokmin Yun, Anyang-si (KR); Edam Kim, Goyang-si (KR)

(73) Assignee: AIVEX Co., Ltd., Yongin-si (KR)

( * ) Notice: Subject to any disclaimer, the term of this patent is extended or adjusted under 35 U.S.C. 154(b) by 0 days.

(21) Appl. No.: 19/228,903

(22) Filed: Jun. 5, 2025

(65) Prior Publication Data

US 2026/0099913 A1 Apr. 9, 2026

(30) Foreign Application Priority Data

Oct. 7, 2024 (KR) ........................ 10-2024-0135528

(51) Int. Cl.
*G06T 7/00* (2017.01)
*G06T 5/50* (2006.01)
*H04N 23/85* (2023.01)
*H04N 23/90* (2023.01)

(52) U.S. Cl.
CPC ................ *G06T 7/001* (2013.01); *G06T 5/50* (2013.01); *H04N 23/85* (2023.01); *H04N 23/90* (2023.01); *G06T 2207/10024* (2013.01)

(58) Field of Classification Search
CPC .. G06N 3/09; G06N 3/02; G06N 3/04; G06N 3/044; G06N 3/045; G06N 3/0464; G06N 3/048; G06N 3/08; G06N 3/084; G06N 3/096; G06N 20/00; G06V 10/774
See application file for complete search history.

(56) References Cited

U.S. PATENT DOCUMENTS

| | | | |
|---|---|---|---|
| 10,705,029 B2 | 7/2020 | Nagata | |
| 2008/0316501 A1* | 12/2008 | Hirata | G01B 11/24 |
| | | | 356/601 |
| 2012/0300112 A1* | 11/2012 | Natsume | G06T 3/08 |
| | | | 348/E5.025 |
| 2014/0055774 A1 | 2/2014 | Sugihara et al. | |
| 2015/0204778 A1 | 7/2015 | Kubiak | |
| 2023/0410406 A1* | 12/2023 | Miyagi | G06T 15/506 |
| 2025/0005848 A1* | 1/2025 | Wang | G06T 15/506 |

FOREIGN PATENT DOCUMENTS

| | | |
|---|---|---|
| JP | 10326348 A | 12/1998 |
| KR | 1020050014127 A | 2/2005 |
| KR | 1020150075079 A | 12/2015 |

(Continued)

OTHER PUBLICATIONS

Korean Patent Office, Notice of Allowance in corresponding KR Application No. 10-2024-0135528, dated Mar. 1, 2025.

*Primary Examiner* — Neil R Mikeska
(74) *Attorney, Agent, or Firm* — Jodi A. Reynolds; Harter Secrest & Emery LLP

(57) ABSTRACT

Disclosed is an apparatus for inspecting an appearance of a product. The apparatus may include: a reference camera for capturing an object in a reference direction; and a plurality of auxiliary cameras for capturing the object in a plurality of auxiliary directions different from the reference direction and the plurality of auxiliary cameras may be arranged in a shape in which the plurality of auxiliary cameras are symmetric to each other when projected onto a plane perpendicular to the reference direction.

12 Claims, 7 Drawing Sheets

100

PROCESSOR —110

MEMORY —130

NETWORK UNIT —150

(56)        References Cited

FOREIGN PATENT DOCUMENTS

| KR |  101611823 B1 | 4/2016 |
|----|---------------|--------|
| KR | 1020150087134 A | 11/2016 |
| KR | 1020170043569 A | 12/2018 |
| KR |  102137539 B1 | 7/2020 |
| KR |  102300338 B1 | 9/2021 |
| KR | 1020210128357 A | 10/2021 |
| KR | 1020220135460 A | 12/2022 |
| KR |  102535869 B1 | 5/2023 |
| KR | 1020210128457 A | 8/2023 |
| KR | 1020240039584 A | 3/2024 |

* cited by examiner

100

PROCESSOR — 110

MEMORY — 130

NETWORK UNIT — 150

APPARATUS FOR INSPECTING THE APPEARANCE OF PRODUCTS

CROSS-REFERENCE TO RELATED APPLICATIONS

This application claims priority to and the benefit of Korean Patent Application No. 10-2024-00135528 filed in the Korean Intellectual Property Office on Oct. 7, 2024, the entire contents of which are incorporated herein by reference.

TECHNICAL FIELD

The present disclosure relates to an apparatus for inspecting the appearance of products, and more particularly, to a technology of inspecting the appearance of products by utilizing a plurality of cameras.

BACKGROUND ART

An existing inspection for selecting a defect of a product requires a lot of manpower because an operator manually performs the inspection based on subjective recognition and judgment on a defect criterion with the naked eye, and has limitations when a large quantity of multi-variety products are inspected over a long period of time. A non-contact type computer vision inspection system capable of performing real-time inspections is most effective as a means that can be applied to such an inspection of a large-quantity of multi-variety products and can flexibly cope with various types of inspection items. Among them, as a machine vision has emerged as a core of an inspection process, the machine vision has become an important point of a manufacturing process while solving various problems such as securing reliability of inspection results and replacing high wages. For reference, the machine vision is a technology that obtains image data using electrical, optical, and non-contact technology, processes and analyzes an image, and derives a desired conclusion, and has been actively applied in the field of component inspection even in Korea in recent years.

Korean Patent Unexamined Publication No. 10-2024-0039584 (Mar. 26, 2024) discloses an apparatus and a method for inspecting the appearance of products.

SUMMARY OF THE INVENTION

The present disclosure has been made in an effort to provide an apparatus for inspecting the appearance of products, which may precisely inspect an appearance of an object by capturing images of the object at various angles by utilizing a plurality of cameras.

On the other hand, the technical problem to be achieved by the present disclosure is not limited to the technical problem mentioned above, and various technical problems may be included within the range obvious to those skilled in the art from the content to be described below.

In order to achieve the above-described object, an exemplary embodiment of the present disclosure provides an apparatus for inspecting an appearance of a product. The apparatus may include: a reference camera for capturing an object in a reference direction; and a plurality of auxiliary cameras for capturing the object in a plurality of auxiliary directions different from the reference direction, and the plurality of auxiliary cameras may be arranged in a shape in which the plurality of auxiliary cameras are symmetric to each other when projected onto a plane perpendicular to the reference direction.

In an exemplary embodiment, the reference direction may be a direction for capturing a plan view direction of the object, the plurality of auxiliary directions may be tilted directions that are not parallel to the reference direction, angles at which the plurality of respective auxiliary directions are tilted from the reference direction may be the same as each other, and the plurality of auxiliary cameras may be arranged in a shape in which the plurality of auxiliary cameras are rotationally symmetrical when projected onto the plane perpendicular to the reference direction.

In an exemplary embodiment, the plurality of auxiliary cameras may include a first auxiliary camera, a second auxiliary camera, a third auxiliary camera, and a fourth auxiliary camera, and a first auxiliary direction of the first auxiliary camera may be parallel to a third auxiliary direction of the third auxiliary camera when projected onto the plane perpendicular to the reference direction, and the first auxiliary direction of the first auxiliary camera may be perpendicular to a second auxiliary direction of the second auxiliary camera and a fourth auxiliary direction of the fourth auxiliary camera when projected onto the plane perpendicular to the reference direction.

In an exemplary embodiment, the reference camera may be configured to photograph two or more objects simultaneously in the reference direction, each of the plurality of auxiliary cameras may be configured to photograph only one of the two or more objects, and the plurality of auxiliary cameras may be classified into two or more groups corresponding to the two or more objects, respectively.

In an exemplary embodiment, the reference direction may be a direction for capturing plan view directions of the two or more objects, the plurality of auxiliary directions may be tilted directions that are not parallel to the reference direction, angles at which respective auxiliary directions belonging to the same group are tilted from the reference direction may be the same as each other, and the auxiliary cameras belonging to the same group may be arranged in a shape in which the auxiliary cameras are rotationally symmetric to each other when projected onto the plane perpendicular to the reference direction.

In an exemplary embodiment, the two or more objects may include a first object and a second object, the reference camera may simultaneously photograph the first object and the second object, the plurality of auxiliary cameras may include a first group of auxiliary cameras corresponding to the first object and a second group of auxiliary cameras corresponding to the second object, and auxiliary directions of the first group of auxiliary cameras or auxiliary directions of the second group of auxiliary cameras, are parallel or perpendicular to each other within the same group when projected onto the plane perpendicular to the reference direction.

In an exemplary embodiment, the first group of auxiliary cameras may include a first-first auxiliary camera, a first-second auxiliary camera, a first-third auxiliary camera, and a first-fourth auxiliary camera, and a first-first auxiliary direction of the first-first auxiliary camera may be parallel to a first-third auxiliary direction of the first-third auxiliary camera when projected onto the plane perpendicular to the reference direction, and the first-first auxiliary direction of the first-first auxiliary camera may be perpendicular to a first-second auxiliary direction of the first-second auxiliary camera and a first-fourth auxiliary direction of the first-fourth auxiliary camera when projected onto the plane perpendicular to the reference direction.

In an exemplary embodiment, the second group of auxiliary cameras may include a second-first auxiliary camera, a second-second auxiliary camera, a second-third auxiliary camera, and a second-fourth auxiliary camera, and a second-first auxiliary direction of the second-first auxiliary camera may be parallel to a second-third auxiliary direction of the second-third auxiliary camera when projected onto the plane perpendicular to the reference direction, and the second-first auxiliary direction of the second-first auxiliary camera may be perpendicular to a second-second auxiliary direction of the second-second auxiliary camera and a second-fourth auxiliary direction of the second-fourth auxiliary camera when projected onto the plane perpendicular to the reference direction.

In an exemplary embodiment, the apparatus may further include a processor configured to correct at least one auxiliary image of a plurality of auxiliary images of the plurality of auxiliary cameras based on a reference image captured by the reference camera.

In an exemplary embodiment, the processor may be configured to correct a color of the at least one auxiliary image based on the reference image.

In an exemplary embodiment, the processor may be configured to perform an operation of converting the at least one auxiliary image into LAB color space information; an operation of correcting the LAB color space information of the at least one auxiliary image by utilizing statistical information of the reference image; and an operation of generating, based on the corrected LAB color space information, at least one color-corrected auxiliary image.

In an exemplary embodiment, the operation of correcting the LAB color space information of the at least one auxiliary image by utilizing the statistical information of the reference image may include an operation of scaling each of an L channel, an A channel, and a B channel of the at least one auxiliary image by a unit variance, and an operation of re-scaling each channel by using the statistical information of the reference image.

In an exemplary embodiment, the operation of converting the at least one auxiliary image into the LAB color space information may include an operation of converting RGB color space information for the at least one auxiliary image into the LAB color space information, and the operation of generating, based on the corrected LAB color space information, at least one color-corrected auxiliary image may include an operation of converting the corrected LAB color space information into corrected RGB color space information to generate the at least one color-corrected auxiliary image.

In an exemplary embodiment, the apparatus may further include a processor configured to change direction information or position information associated with the plurality of auxiliary cameras based on a reference image captured by the reference camera.

In an exemplary embodiment, the processor may be further configured to perform, based on the reference image, a control operation of changing at least one of the plurality of auxiliary directions of the plurality of auxiliary cameras.

According to an exemplary embodiment of the present disclosure, by capturing a product at various angles, it is possible to find subtle defects that might be overlooked when the product is photographed in only one direction, thereby accurately detecting defects such as appearance defects, fine scratches, or shape distortions.

On the other hand, the effect of the present disclosure is not limited to the above-mentioned effects, and various effects may be included within the range apparent to those skilled in the art from the content to be described below.

DETAILED DESCRIPTION

Figures 1, 2:
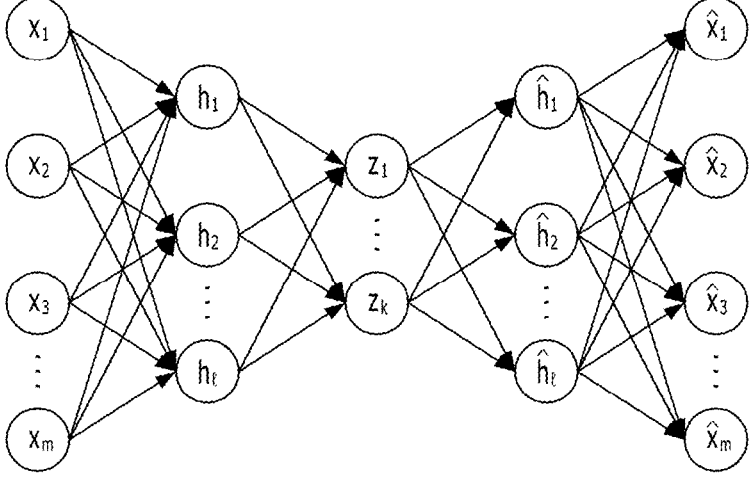
FIG. 1 is a block diagram of a computing device for inspecting the appearance of products according to an exemplary embodiment of the present disclosure.
FIG. 2 illustrates an exemplary structure of an artificial intelligence-based model according to an embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

Further, a term "or" intends to mean comprehensive "or" not exclusive "or". That is, unless otherwise specified or when it is unclear in context, "X uses A or B" intends to mean one of the natural comprehensive substitutions. That is, in the case where X uses A; X uses B; or, X uses both A and B, "X uses A or B" may apply to either of these cases. Further, a term "and/or" used in the present specification shall be understood to designate and include all of the possible combinations of one or more items among the listed relevant items.

Further, a term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Further, the term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function and an artificial neural network and a neural network may be interchangeably used.

FIG. 1 is a block diagram of a computing device for inspecting the appearance of products according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing configuration of the computing device 100 and only some of the disclosed components may constitute the computing device 100.

The computing device 100 may include a processor 110, a memory 130, and a network unit 150.

The processor 110 may be constituted by one or more cores, and include processors for data analysis and deep learning, such as a central processing unit (CPU), a general purpose graphics processing unit (GPGPU), a tensor processing unit (TPU), etc., of the computing device. The processor 110 may read a computer program stored in the memory 130 and process data for machine learning according to an exemplary embodiment of the present disclosure. According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like.

At least one of the CPU, the GPGPU, and the TPU of the processor 110 may process learning of the network function. For example, the CPU and the GPGPU may process the learning of the network function and data classification using the network function jointly. In addition, in an exemplary embodiment of the present disclosure, the learning of the network function and the data classification using the network function may be processed by using processors of a plurality of computing devices together. In addition, the computer program performed by the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 150 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

In the present disclosure, the network unit (150) can utilize various forms of wired and wireless communication systems.

The technologies described in this specification can be used not only in the mentioned networks but also in other networks.

When an element or layer is referred to as "on" or "above" another element or layer, this includes both directly on top of another element or layer as well as with another layer or another element interposed in the middle. On the other hand, when a component is referred to as "directly on" or "directly above" it indicates that there is no other component or layer intervening.

The spatially relative terms "below," "beneath," "lower," "above," "upper," and the like may be used to facilitate the description of one component or its relationship to other components as shown in the drawings. Spatially relative terms should be understood to include different orientations of an element in use or operation in addition to the orientations shown in the drawings.

For example, a component described as "below" or "beneath" another component may be placed "above" another component when the components shown in the drawing are inverted. Thus, the exemplary term "below" can include both below and above orientations. Components may also be oriented in other directions, and accordingly, spatially relative terms may be interpreted according to their orientation.

Further, as used herein, the terms "apparatus" and "device" may often be used interchangeably.

FIG. 2 illustrates an exemplary structure of an artificial intelligence-based model according to an embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
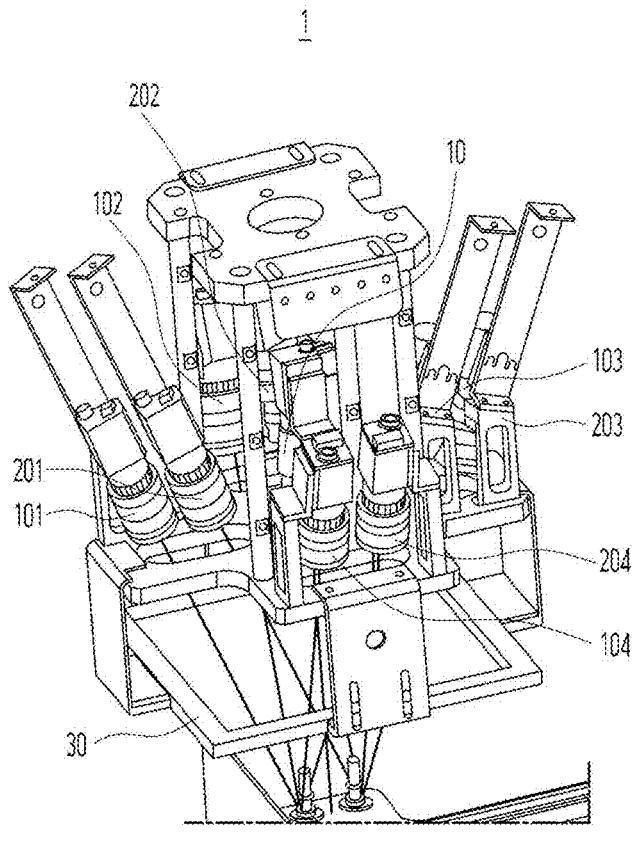
FIG. 3 is a diagram schematically illustrating an apparatus for inspecting the appearance of products according to an exemplary embodiment of the present disclosure.

FIG. 3 is a diagram schematically illustrating an apparatus for inspecting the appearance of products according to an exemplary embodiment of the present disclosure.

According to an exemplary embodiment of the present disclosure, an apparatus for inspecting the appearance of products may include a reference camera 10, a plurality of auxiliary cameras, and a light 30. Further, a plurality of modules that may be included in the apparatus for inspecting the appearance of products may be controlled by the processor 110 or implemented by an operation of the processor 110. The light 30 may be arranged parallel to a plate P on which the product is located. As an example, the light 30 may be a flat dome light, and may irradiate light incident from a side to a lower side where an object is located.

According to an exemplary embodiment of the present disclosure, the reference camera may photograph an object in a reference direction. Exemplarily, the reference direction is a direction for capturing a plan view direction of the object. For example, the reference direction means a shooting direction of the camera set according to a specific reference, and is a shooting direction defined around the specific reference of the object. As an example, the reference direction is a plan view direction of the object, i.e., a direction for capturing an upper surface of the object. For example, the reference camera is in a state of directly capturing the upper surface of the object, which may serve to capture an overall planar shape of the object with the reference camera positioned vertically above the object.

According to an exemplary embodiment of the present disclosure, the plurality of auxiliary cameras may photograph an object in a plurality of auxiliary directions different from the reference direction. For example, the plurality of auxiliary directions may be tilted directions that are not parallel to the reference direction. For reference, tilting may mean that the camera performs capturing in a state of being tilted by a predetermined angle with respect to the reference direction. For example, the auxiliary cameras may be arranged to photograph a lateral surface or a side surface of the object, and the auxiliary cameras may photograph the object at various angles in a tilted position relative to the reference direction. Here, angles at which the plurality of auxiliary directions are tilted from the reference direction, respectively may be the same as each other. The plurality of respective auxiliary cameras may be arranged to be tilted at the same angle (e.g., an acute angle) with respect to a capturing direction of the reference camera, thereby capturing various surfaces of the object at a uniform angle. Exemplarily, the plurality of auxiliary cameras may be arranged in a shape in which the plurality of respective auxiliary cameras are rotationally symmetrical when projected onto a plane perpendicular to the reference direction. As an example, the plane perpendicular to the reference direction may be a plane that intersects a top surface (upper surface) of the object at a 90 degree angle. The plane may be a plane that includes sides (e.g., front, back, left, and right) of the object in the plane perpendicular to the reference direction. For example, if there are four auxiliary cameras, the plurality of auxiliary cameras may be arranged symmetrically to each other by dividing a periphery of the object at 360 degrees. The plurality of respective auxiliary cameras are tilted at the same tilting angle (e.g., the acute angle), but since the plurality of respective auxiliary cameras are rotationally symmetrical, the plurality of auxiliary cameras may be photographed at an equal angle while surrounding the object. The plurality of auxiliary cameras are evenly arranged around the object, and this arrangement may be symmetrical with respect to the reference direction. For example, if there are four auxiliary cameras, each camera surrounds the object in a rotationally symmetrical shape by 90 degrees, so that imaging may be performed evenly on all sides, and the symmetrical arrangement may provide a consistent result when analyzing the captured image.

Exemplarily, the plurality of auxiliary cameras may include a first auxiliary camera, a second auxiliary camera, a third auxiliary camera, and a fourth auxiliary camera. In this case, a first auxiliary direction of the first auxiliary camera may be parallel to a third auxiliary direction of the third auxiliary camera when projected onto the plane perpendicular to the reference direction. For example, the plane perpendicular to the reference direction may be a virtual plane that intersects with the reference direction at the 90 degree angle. As an example, the reference camera is capturing an upper surface (e.g., a plan view) direction, and correspondingly, the plane perpendicular to the reference direction may include a lateral surface or a side surface of the object. Further, the first auxiliary direction of the first auxiliary camera and the third auxiliary direction of the third auxiliary camera may be directions viewed by cameras that photograph the object at different angles. The first auxiliary camera and the third auxiliary camera may be provided to photograph the object at an auxiliary angle different from a direction in which the reference camera photographs, so that more various surfaces of the object may be inspected. As an example, when projected onto the plane perpendicular to the reference direction may mean a state in which a direction in which the first auxiliary camera and the third auxiliary camera are photographed is projected at the 90-degree angle with the direction in which the reference camera is photographed. For example, being parallel in this state may mean that directions in which the two auxiliary cameras look are arranged in parallel in the same plane. That is, although the first auxiliary camera and the third auxiliary camera are respectively located at different positions, the shooting directions of the first auxiliary camera and the third auxiliary camera may face the same direction in the same plane.

Further, the first auxiliary direction of the first auxiliary camera may be perpendicular to the second auxiliary direction of the second auxiliary camera and the fourth auxiliary direction of the fourth auxiliary camera when projected onto a plane perpendicular to the reference direction. For example, the plane perpendicular to the reference direction may be a virtual plane that intersects with the reference direction at the 90 degree angle. As an example, the reference camera is capturing an upper surface (e.g., a plan view) direction, and correspondingly, the plane perpendicular to the reference direction may include a lateral surface or a side surface of the object. Further, the second auxiliary direction of the second auxiliary camera and the fourth auxiliary direction of the fourth auxiliary camera may be directions viewed by cameras that photograph the object at different angles. The second auxiliary camera and the fourth auxiliary camera may be provided to photograph the object at an auxiliary angle different from a direction in which the reference camera photographs, so that more various surfaces of the object may be inspected. As an example, when projected onto the plane perpendicular to the reference direction may mean a state in which a direction in which the second auxiliary camera and the fourth auxiliary camera are photographed is projected at the 90-degree angle with the direction in which the reference camera is photographed. For example, being parallel in this state may mean that directions in which the two auxiliary cameras look are arranged in parallel in the same plane. That is, although the second auxiliary camera and the fourth auxiliary camera are respectively located at different positions, the shooting directions of the second auxiliary camera and the fourth auxiliary camera may face the same direction in the same plane.

Hereinafter, the apparatus 1 for inspecting the appearance of products, which inspects two or more objects will be described in more detail with reference to FIGS. 4 and 5.

Figure 4:
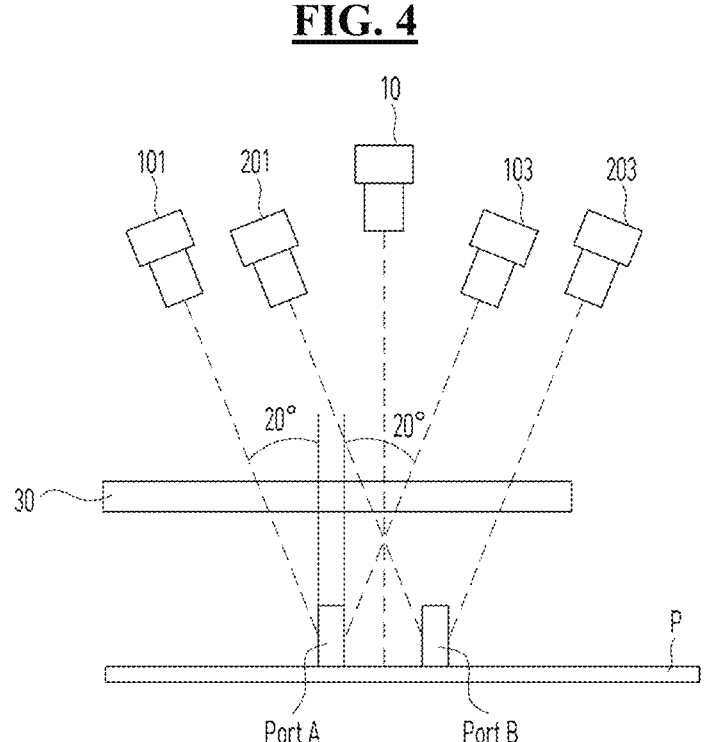
FIG. 4 is a diagram for describing an arrangement of a reference camera and a plurality of auxiliary cameras of the apparatus for inspecting the appearance of products according to an exemplary embodiment of the present disclosure.
Figure 5:
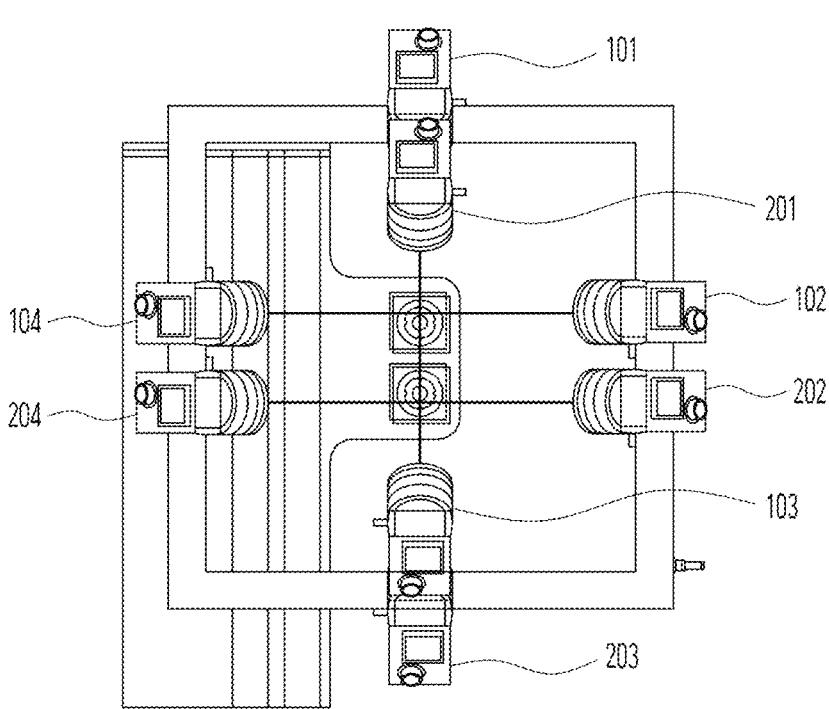
FIG. 5 is a diagram schematically illustrating a plan view for a part of the apparatus for inspecting the appearance of products according to an exemplary embodiment of the present disclosure.

FIG. 4 is a diagram for describing an arrangement of a reference camera and a plurality of auxiliary cameras of the apparatus for inspecting the appearance of products according to an exemplary embodiment of the present disclosure and FIG. 5 is a diagram schematically illustrating a plan view for a part of the apparatus for inspecting the appearance of products according to an exemplary embodiment of the present disclosure.

Meanwhile, referring to FIG. 4, two or more objects described below may include a first object Port A and a second object Port B.

According to an exemplary embodiment of the present disclosure, the reference camera 10 may be configured to simultaneously photograph two or more objects in the reference direction. As an example, referring to FIG. 4, the reference direction may be a direction for capturing a plan view direction of two or more objects. For example, the reference direction means a shooting direction of the camera set according to a specific reference, and is a shooting direction defined around the specific reference of two or more objects. As an example, the reference direction is a plan view direction of two or more objects, i.e., a direction for capturing an upper surface of two or more objects. For example, the reference camera is in a state of directly capturing the upper surface of two or more objects, which may serve to capture an overall planar shape of the object with the reference camera positioned vertically above two or more objects.

According to an exemplary embodiment of the present disclosure, the plurality of auxiliary cameras may photograph an object in a plurality of auxiliary directions different from the reference direction. For example, the plurality of auxiliary directions may be tilted directions that are not parallel to the reference direction. For reference, tilting may mean that the camera performs capturing in a state of being tilted by a predetermined angle with respect to the reference direction. For example, the auxiliary cameras may be arranged to photograph a lateral surface or a side surface of the object, and the auxiliary cameras may photograph the object at various angles in a tilted position relative to the reference direction.

According to an exemplary embodiment, each of a plurality of auxiliary cameras 101, 102, 103, 104, 201, 202, 203, and 204 may be configured to photograph only one of the two or more objects. Further, the plurality of auxiliary cameras 101, 102, 103, 104, 201, 202, 203, and 204 may be classified into two or more groups corresponding to the two or more objects, respectively. For example, the plurality of auxiliary cameras 101, 102, 103, 104, 201, 202, 203, and 204 may include a first group of auxiliary cameras corresponding to the first object Port A and a second group of auxiliary cameras corresponding to the second object Port B. For example, angles at which the plurality of respective auxiliary directions belonging to the same group are tilted from the reference direction may be the same as each other. Each of the plurality of auxiliary cameras belonging to the same group may be arranged to be tilted at the same angle (e.g., an acute angle) with respect to a capturing direction of the reference camera, thereby capturing various surfaces of the object at a uniform angle. Exemplarily, the plurality of auxiliary cameras belonging to the same group may be arranged in a shape that the plurality of respective auxiliary cameras are rotationally symmetrical to each other when projected onto a plane perpendicular to the reference direction. For example, if there are four auxiliary cameras, the auxiliary cameras may be arranged symmetrically to each other by dividing a periphery of the object at 360 degrees. The plurality of respective auxiliary cameras are tilted at the same tilting angle (e.g., the acute angle), but since the plurality of respective auxiliary cameras are rotationally symmetrical, the plurality of auxiliary cameras may be photographed at an equal angle while surrounding the object. The plurality of auxiliary cameras are evenly arranged around the object, and this arrangement may be symmetrical with respect to the reference direction. For example, if there are four auxiliary cameras, each camera surrounds the object in a rotationally symmetrical shape by 90 degrees, so that imaging may be performed evenly on all sides, and the symmetrical arrangement may provide a consistent result when analyzing the captured image.

According to an exemplary embodiment, auxiliary directions of auxiliary cameras of the first group or auxiliary directions of auxiliary cameras of the second group, when projected onto the plane perpendicular to the reference direction, may be parallel or perpendicular to each other within the same group. Exemplarily, the first group of auxiliary cameras may include a first-first auxiliary camera 101, a first-second auxiliary camera 102, a first-third auxiliary camera 103, and a first-fourth auxiliary camera 104. For example, referring to FIGS. 4 and 5, a first-first auxiliary direction of the first-first auxiliary camera 101 may be parallel to a first-third auxiliary direction of the first-third auxiliary camera 103 when projected onto the plane perpendicular to the reference direction. In other words, the reference camera 10 may be provided at a vertically descending position, which is a direction for capturing a plan view direction of two or more objects. Since the reference direction is a direction in which the reference camera 10 performs capturing, the reference direction may be regarded as a direction in which a top surface (upper surface) of the object is photographed. As an example, the plane perpendicular to the reference direction may be a plane that intersects with the top surface (upper surface) of the object at a 90 degree angle. That is, the plane may be a plane that includes sides (e.g., front, back, left, and right) of the object in the plane perpendicular to the reference direction. Exemplarily, the first-first auxiliary camera 101 and the first-third auxiliary camera 103 may photograph a front surface and a back surface of the first object Port A, respectively. The first-first auxiliary direction of the first-first auxiliary camera 101 and the first-third auxiliary direction of the first-third auxiliary camera 103 face the front and back surfaces of the first object Port A, but when viewed in the plane perpendicular to the reference direction, the two directions may be parallel to each other. When the directions in which the first-first auxiliary camera 101 and the first-third auxiliary camera 103 are photographed are projected on the plane, lines of sight of the first-first auxiliary cameras 101 and first-third auxiliary cameras 103 may be viewed as being arranged side by side in the same direction. Although the first-first auxiliary camera 101 and the first-third auxiliary camera 103 are capturing the front surface and the back surface, capturing paths of the two cameras follow parallel paths when viewed from a vertical plane, and thus may appear as if the first-first auxiliary camera 101 and the first-third auxiliary camera 103 are arranged side by side on the plane. Further, the first-first auxiliary direction of the first-first auxiliary camera 101 may be perpendicular to both the first-second auxiliary direction of the first-second auxiliary camera 102 and the first-fourth auxiliary direction of the first-fourth auxiliary camera 104, when these directions are projected onto the plane perpendicular to the reference direction. Exemplarily, assuming that the first-first auxiliary camera 101 photographs the front surface of the first object Port A, the first-first auxiliary direction of the first-first auxiliary cameras 101 may be facing the front surface of the first object Port A. Assuming that the first-second auxiliary camera 102 and the first-fourth auxiliary camera 104 respectively photograph the lateral surfaces (e.g., a left side and a right side) of the first object Port A, since the front-facing capturing direction and the right- and left-facing capturing directions are perpendicular to each other, the first-first auxiliary direction of the first-first auxiliary camera 101 may be perpendicular to the first-second auxiliary direction of the first-second auxiliary camera 102 and the first-fourth auxiliary direction of the first-fourth auxiliary camera 104 when projected onto the plane perpendicular to the reference direction.

Exemplarily, the second group of auxiliary cameras may include a second-first auxiliary camera 201, a second-second auxiliary camera 202, a second-third auxiliary camera 203, and a second-fourth auxiliary camera 204. For example, referring to FIGS. 4 and 5, a second-first auxiliary direction of the second-first auxiliary camera 201 may be parallel to a second-third auxiliary direction of the second-third auxiliary camera 203 when projected onto the plane perpendicular to the reference direction. In other words, the reference camera 10 may be provided at a vertically descending position, which is a direction for capturing a plan view direction of two or more objects. Since the reference direction is a direction in which the reference camera 10 performs capturing, the reference direction may be regarded as a direction in which a top surface (upper surface) of the object is photographed. As an example, the plane perpendicular to the reference direction may be a plane that intersects with the top surface (upper surface) of the object at a 90 degree angle. That is, the plane may be a plane that includes sides (e.g., front, back, left, and right) of the object in the plane perpendicular to the reference direction. Exemplarily, the second-first auxiliary camera 201 and the second-third auxiliary camera 203 may photograph a front surface and a back surface of the second object Port B, respectively. The second-first auxiliary direction of the second-first auxiliary camera 201 and the second-third auxiliary direction of the second-third auxiliary camera 203 face the front and back surfaces of the second object Port B, but when viewed in the plane perpendicular to the reference direction, the two directions may be parallel to each other. When the directions in which the second-first auxiliary camera 201 and the second-third auxiliary camera 203 are photographed are projected on the plane, lines of sight of the second-first auxiliary cameras 201 and the second-third auxiliary cameras 203 may be viewed as being arranged side by side in the same direction. Although the second-first auxiliary camera 201 and the second-third auxiliary camera 203 are capturing the front surface and the back surface, capturing paths of the two cameras follow parallel paths when viewed from a vertical plane, and thus may appear as if the second-first auxiliary camera 201 and the second-third auxiliary camera 203 are arranged side by side on the plane. Further, the second-first auxiliary direction of the second-first auxiliary camera 201 may be perpendicular to the second-second auxiliary direction of the second-second auxiliary camera 202 and the second-fourth auxiliary direction of the second-fourth auxiliary camera 204 when projected onto the plane perpendicular to the reference direction. Exemplarily, assuming that the second-first auxiliary camera 201 photographs the front surface of the second object Port B, the second-first auxiliary direction of the second-first auxiliary cameras 201 may be facing the front surface of the second object Port B. Assuming that the second-second auxiliary camera 202 and the second-fourth auxiliary camera 204 respectively photograph the lateral surfaces (e.g., the left side and the right side) of the second object Port B, since the front-facing capturing direction and the right- and left-facing capturing directions are perpendicular to each other, the second-first auxiliary direction of the second-first auxiliary camera 201 may be perpendicular to the second-second auxiliary direction of the second-second auxiliary camera 202 and the second-fourth auxiliary direction of the second-auxiliary camera 204 when projected onto the plane perpendicular to the reference direction.

Figures 6A, 6B, 6C:
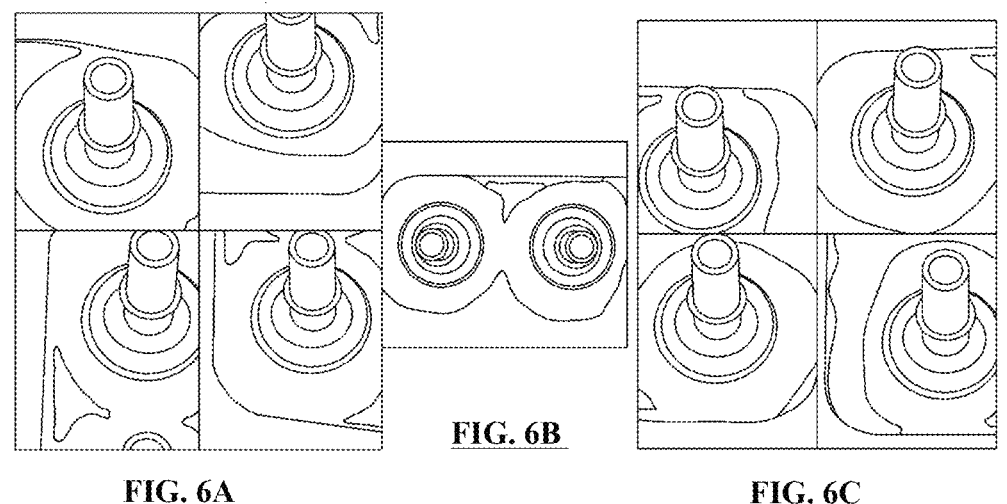
FIGS. 6A, 6B, and 6C illustrate an image captured by the reference camera and the plurality of auxiliary cameras of the apparatus for inspecting the appearance of products according to an exemplary embodiment of the present disclosure.

FIGS. 6A, 6B, and 6C illustrate an image captured by the reference camera and the plurality of auxiliary cameras of the apparatus for inspecting the appearance of products according to an exemplary embodiment of the present disclosure.

Referring to FIG. 6A, the first group of auxiliary cameras may photograph a first object in tilted directions that are not parallel to the reference direction. Further, referring to FIG. 6B, the reference camera 10 may photograph plan view directions of the first object and a second object. Further, referring to FIG. 6C, the second group of auxiliary cameras may photograph the second object in the tilted directions that are not parallel to the reference direction.

Hereinafter, an operation flow of the present disclosure will be described in brief based on the contents described in detail.

Figure 7:
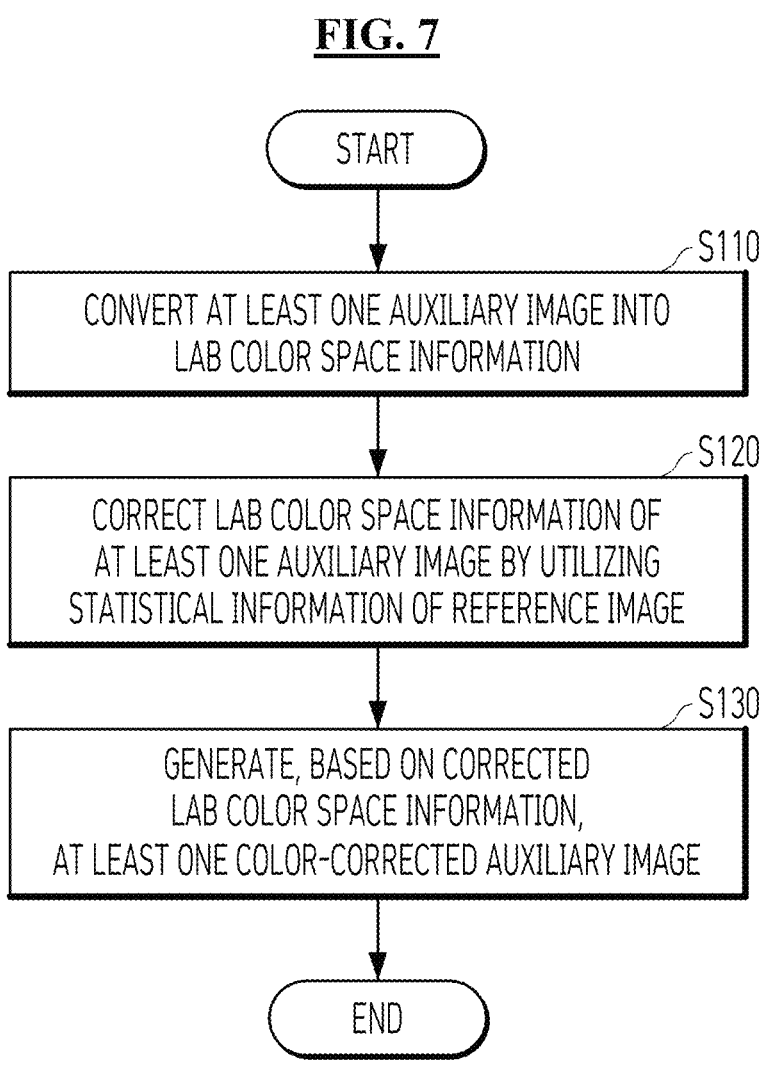
FIG. 7 is a flowchart illustrating a method of correcting a color of at least one auxiliary image based on a reference image according to an exemplary embodiment of the present disclosure.

FIG. 7 is a flowchart illustrating a method of correcting a color of at least one auxiliary image based on a reference image according to an exemplary embodiment of the present disclosure.

A method for correcting a color of at least one auxiliary image based on the reference image illustrated in FIG. 7 may be performed by the computing device 100 described above. Hereinafter, in spite of contents omitted below, the contents described regarding the computing device 100 may also be similarly applied to a description of the method for correcting a color of at least one auxiliary image based on the reference image.

According to an exemplary embodiment of the present disclosure, the processor 110 may correct at least one auxiliary image among a plurality of auxiliary images of a plurality of auxiliary cameras based on the reference image (see FIG. 6B) captured by the reference camera 10. Further, the processor 110 may correct, based on the reference image, the color of at least one auxiliary image. Meanwhile, the reference image described below is an image captured by the reference camera 10 (see FIG. 6B), and the plurality of auxiliary images may be images captured by the plurality of auxiliary cameras 101, 102, 103, 104, 201, 202, 203, and 204 (see FIGS. 6A and 6C).

More specifically, referring to FIG. 7, the processor 110 may convert at least one auxiliary image into LAB color space information (S110). For reference, a LAB color space is one of the methods of expressing a color of an image, and is a color space based on a scheme in which a human eye recognizes a color. Here, an L channel may indicate brightness, an A channel may indicate color information between green and red, and a B channel may indicate color information between blue and yellow. In addition, the processor 110 may convert RGB color space information for the at least one auxiliary image into the LAB color space information. For example, the RGB color space information is a method of representing a color by a combination of red, green, and blue, whereas the LAB color space information may be processed by separating a brightness of the color and a color change between two axes A and B. The processor 110 may convert the RGB color space information for at least one auxiliary image into the LAB color space information, thereby independently adjusting the brightness and the color in a color correction operation.

Exemplarily, the processor 110 may correct the LAB color space information of at least one auxiliary image by utilizing statistical information of the reference image (S120). For example, the processor 110 may calculate a mean value and a standard deviation of the LAB color space information in the reference image. Such statistical information may be an important factor in determining an overall brightness and color of the image. As an example, the processor 110 may scale each of the L channel, the A channel, and the B channel of at least one auxiliary image by a unit variance. For example, scaling may be a process of fitting a value of each channel to a unit variance. Here, the unit variance may mean a state in which the mean is 0 and the standard deviation is 1. The processor 110 may perform scaling by subtracting a mean value from each of the L channel, the A channel, and the B channel of at least one auxiliary image, and then dividing the mean value by the standard deviation. In addition, the processor 110 may rescale each channel by using the statistical information of the reference image. For example, the statistical information (e.g., the mean and the standard deviation) of the reference image may be used to rescale each channel of the scaled auxiliary image to match the distribution of the reference image. To this end, the standard deviation of the reference image may be multiplied by each channel of at least one auxiliary image to generate a distribution similar to the reference image. In addition, the processor 110 may re-center each channel by using the statistical information of the reference image. For example, the processor 110 may re-center each of the rescaled channels. The processor 110 may perform re-centering of re-centering the value of each channel by using the mean value in the statistical information of the reference image. As an example, the re-centering process may be performed by adding the mean value of the reference image again. Through the re-centering process, L-channel, A-channel, and B-channel values of at least one auxiliary image may be adjusted according to statistical characteristics (e.g., the mean and the standard deviation) of the reference image, and a color difference may be corrected. When the L channel, the A channel, and the B channel of at least one auxiliary image are scaled and re-centered according to the statistical information of the reference image through step S120, at least one auxiliary image may have a color characteristic consistent with the reference image.

Exemplarily, the processor 110 may generate at least one color-corrected auxiliary image based on corrected LAB color space information (S130). Further, the processor 110 may generate at least one color-corrected auxiliary image by converting the corrected LAB color space information into corrected RGB color space information. For example, the processor 110 may, after the brightness and the color in the LAB color space of at least one auxiliary image are corrected according to the statistics of the reference image, finally generate at least one color-corrected auxiliary image based on the corrected LAB color space information. For reference, since the RGB color space is a color space suitable for display output, the processor 110 may generate at least one color-corrected auxiliary image, thereby finally outputting an image having visually consistent color information.

Meanwhile, the method for correcting the color of at least one auxiliary image is a method for maintaining the color consistency of the images captured by the plurality of cameras, and may minimize a color feeling difference of the images obtained from the plurality of cameras.

According to an exemplary embodiment of the present disclosure, the processor 110 may change direction information or position information associated with the plurality of auxiliary cameras, based on the reference image captured by the reference camera. Exemplarily, the processor 110 may analyze the reference image captured by the reference camera to determine a position, a characteristic shape, and the like of the object. For example, the processor 110 may utilize a computer vision algorithm to detect and analyze specific patterns, shapes, and defective regions in the reference image. Further, the processor 110 may utilize a deep learning-based image processing model to identify the size, position, and characteristic elements of the object, and recognize how the object is arranged in the reference image. As an example, a deep learning-based image processing model may be CNN, YOLO, or the like, but is not limited thereto, and an algorithm that has been developed or will be developed in the future may be applied. In addition, the processor 110 may analyze angle and position information that the plurality of auxiliary cameras currently capture in real time. For example, the processor 110 may apply meta-data such as position information data (X, Y, Z coordinates) and angle data (pitch, yaw, and roll) of the camera to the artificial intelligence model to grasp direction information or position information associated with the plurality of auxiliary cameras. In addition, the processor 110 may grasp directional information or positional information associated with the plurality of auxiliary cameras to be changed, based on information analyzed in the reference image (e.g., a defective site or an important feature of the object, etc.). For example, when it is determined that detailed capturing of a specific portion in the reference image is insufficient, the processor 110 may change direction information or position information associated with the plurality of auxiliary cameras based on a result analyzed by the artificial intelligence model. In other words, the processor 110 may change direction information or position information associated with the plurality of auxiliary cameras around a specific pattern or defect position of the reference image based on a result of analyzing the reference image by applying the reference image to the artificial intelligence. For example, the processor 110 may perform, based on the reference image, a control operation of changing at least one of a plurality of auxiliary directions of the plurality of auxiliary cameras. For example, the processor 110 may perform a control operation such that, based on an analysis result of a reference image analyzed by utilizing artificial intelligence, direction information or position information of at least one of a plurality of auxiliary directions of the plurality of auxiliary cameras 101, 102, 103, 104, 201, 202, 203, and 204 is changed around a specific pattern or defect position.

Meanwhile, the processor 110 may perform, based on the reference image, a control operation of changing at least one of the plurality of auxiliary directions of the plurality of auxiliary cameras, so that the plurality of auxiliary camera may more accurately inspect the appearance of products.

The steps mentioned in the above description may be further split into additional steps, or combined into fewer steps according to an implementation example of the present disclosure. Further, some steps may also be omitted as necessary, and an order between the steps may be changed.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 8:
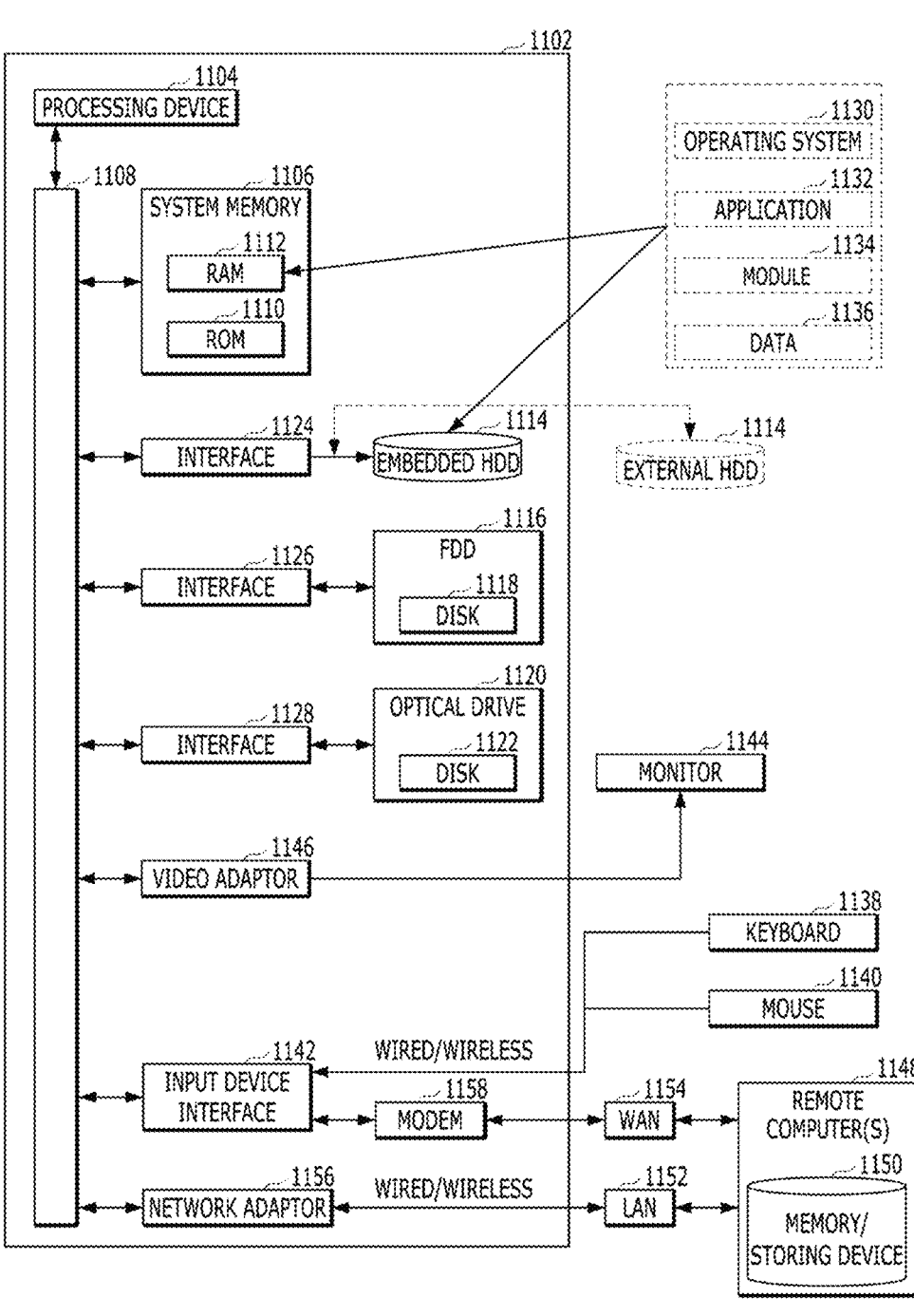
FIG. 8 is a simplified general schematic diagram of an exemplary computing environment in which the embodiments of the present disclosure may be implemented.

FIG. 8 is a simple and normal schematic view of an exemplary computing environment in which the exemplary embodiments of the present disclosure may be implemented.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. An apparatus for inspecting an appearance of a product, the apparatus comprising:
a reference camera for capturing an object in a reference direction;
a plurality of auxiliary cameras for capturing the object in a plurality of auxiliary directions different from the reference direction; and
a processor configured to correct at least one auxiliary image of a plurality of auxiliary images of the plurality of auxiliary cameras based on a reference image captured by the reference camera,
wherein the plurality of auxiliary cameras are arranged in a shape in which the plurality of auxiliary cameras are symmetric to each other when projected onto a plane perpendicular to the reference direction, and
wherein the processor is configured to perform:
an operation of correcting a color of the at least one auxiliary image based on the reference image;
an operation of converting the at least one auxiliary image into LAB color space information;
an operation of correcting the LAB color space information of the at least one auxiliary image by utilizing statistical information of the reference image; and
an operation of generating, based on the corrected LAB color space information, at least one color-corrected auxiliary image.

2. The apparatus of claim 1, wherein the reference direction is a direction for capturing a plan view direction of the object,
wherein the plurality of auxiliary directions are tilted directions that are not parallel to the reference direction,
wherein angles at which the plurality of respective auxiliary directions are tilted from the reference direction are equal to each other, and
wherein the shape in which the plurality of auxiliary cameras are arranged when projected onto the plane perpendicular to the reference direction is a rotationally symmetrical shape.

3. The apparatus of claim 1, wherein the plurality of auxiliary cameras include a first auxiliary camera, a second auxiliary camera, a third auxiliary camera, and a fourth auxiliary camera, and
wherein a first auxiliary direction of the first auxiliary camera is parallel to a third auxiliary direction of the third auxiliary camera when projected onto the plane perpendicular to the reference direction, and
wherein the first auxiliary direction of the first auxiliary camera is perpendicular to a second auxiliary direction of the second auxiliary camera and a fourth auxiliary direction of the fourth auxiliary camera when projected onto the plane perpendicular to the reference direction.

4. The apparatus of claim 1, wherein the reference camera is configured to capture two or more objects simultaneously in the reference direction,
wherein each of the plurality of auxiliary cameras is configured to capture only one of the two or more objects, and
wherein the plurality of auxiliary cameras are classified into two or more groups corresponding to the two or more objects, respectively.

5. The apparatus of claim 4, wherein the reference direction is a direction for capturing plan view directions of the two or more objects,
wherein the plurality of auxiliary directions are tilted directions that are not parallel to the reference direction,
wherein angles at which respective auxiliary directions belonging to a same group are tilted from the reference direction are equal to each other, and
wherein a first group of the plurality of auxiliary cameras belonging to a same group are arranged in a shape in which the first group of the plurality of auxiliary cameras are rotationally symmetric to each other when projected onto the plane perpendicular to the reference direction.

6. The apparatus of claim 4, wherein the two or more objects include a first object and a second object,
wherein the reference camera simultaneously captures the first object and the second object,
wherein the plurality of auxiliary cameras include a first group of auxiliary cameras corresponding to the first object and a second group of auxiliary cameras corresponding to the second object, and
wherein auxiliary directions of the first group of auxiliary cameras or auxiliary directions of the second group of auxiliary cameras are parallel or perpendicular to each other within a same group when projected onto the plane perpendicular to the reference direction.

7. The apparatus of claim 6, wherein the first group of auxiliary cameras include a first-first auxiliary camera, a first-second auxiliary camera, a first-third auxiliary camera, and a first-fourth auxiliary camera, and
wherein a first-first auxiliary direction of the first-first auxiliary camera is parallel to a first-third auxiliary direction of the first-third auxiliary camera when projected onto the plane perpendicular to the reference direction, and
wherein the first-first auxiliary direction of the first-first auxiliary camera is perpendicular to a first-second auxiliary direction of the first-second auxiliary camera and a first-fourth auxiliary direction of the first-fourth auxiliary camera when projected onto the plane perpendicular to the reference direction.

8. The apparatus of claim 6, wherein the second group of auxiliary cameras include a second-first auxiliary camera, a second-second auxiliary camera, a second-third auxiliary camera, and a second-fourth auxiliary camera, and wherein a second-first auxiliary direction of the second-first auxiliary camera is parallel to a second-third auxiliary direction of the second-third auxiliary camera when projected onto the plane perpendicular to the reference direction, and wherein the second-first auxiliary direction of the second-first auxiliary camera is perpendicular to a second-second auxiliary direction of the second-second auxiliary camera and a second-fourth auxiliary direction of the second-fourth auxiliary camera when projected onto the plane perpendicular to the reference direction.

9. The apparatus of claim 1, wherein the operation of correcting the LAB color space information of the at least one auxiliary image by utilizing the statistical information of the reference image includes:

an operation of scaling each of an L channel, an A channel, and a B channel of the at least one auxiliary image by a unit variance, and an operation of re-scaling each channel by using the statistical information of the reference image.

10. The apparatus of claim 1, wherein the operation of converting the at least one auxiliary image into the LAB color space information includes an operation of converting RGB color space information for the at least one auxiliary image into the LAB color space information, and wherein the operation of generating, based on the corrected LAB color space information, at least one color-corrected auxiliary image includes an operation of converting the corrected LAB color space information into corrected RGB color space information to generate the at least one color-corrected auxiliary image.

11. The apparatus of claim 1, wherein the processor is further configured to change direction information or position information associated with the plurality of auxiliary cameras based on the reference image captured by the reference camera.

12. The apparatus of claim 11, wherein the processor is further configured to perform, based on the reference image, a control operation of changing at least one of the plurality of auxiliary directions of the plurality of auxiliary cameras.

* * * * *